INVENTORS.
EDWARD F. MYERS
JOHN R. PORT

BY Edward J. Feeney Jr.
ATTORNEY

| CORE SELECTION TABLE | | | | | |
|---|---|---|---|---|---|
| CORE | SWITCH | DRIVER | CORE | SWITCH | DRIVER |
| C1 | S1 | DR1 | C7 | S4 | DR1 |
| C2 | S1 | DR2 | C8 | S4 | DR2 |
| C3 | S2 | DR1 | C9 | S5 | DR3 |
| C4 | S2 | DR2 | C10 | S5 | DR4 |
| C5 | S3 | DR1 | C11 | S6 | DR3 |
| C6 | S3 | DR2 | C12 | S6 | DR4 |

INVENTORS.
EDWARD F. MYERS
JOHN R. PORT
BY Edward J. Feeney Jr.
ATTORNEY

*INVENTORS.*
EDWARD F. MYERS
JOHN R. PORT

*BY* Edward J. Feeney Jr.
ATTORNEY

INVENTORS.
EDWARD F. MYERS
JOHN R. PORT
BY Edward J. Feeney Jr.
ATTORNEY

INVENTORS.
EDWARD F. MYERS
JOHN R. PORT
BY
Edward J. Feeney Jr.
ATTORNEY

INVENTORS.
EDWARD F. MYERS
JOHN R. PORT
BY Edward J. Feeney Jr.
ATTORNEY

BY

INVENTORS.
EDWARD F. MYERS
JOHN R. PORT

ATTORNEY

INVENTORS.
EDWARD F. MYERS
JOHN R. PORT
BY
Edward J. Feeney Jr
ATTORNEY

INVENTORS.
EDWARD F. MYERS
JOHN R. PORT
BY
*[signature]*
ATTORNEY

United States Patent Office 3,439,345

Patented Apr. 15, 1969

3,439,345

SMALL, LOW COST MEMORY

Edward F. Myers, East Lansdowne, and John R. Port, King of Prussia, Pa., assignors to Burroughs Corporation, Detroit, Mich., a corporation of Michigan Filed Apr. 14, 1966, Ser. No. 542,586
Int. Cl. G06f 7/24
U.S. Cl. 340—172.5 15 Claims

ABSTRACT OF THE DISCLOSURE

A magnetic switching core addressing organization is disclosed for use with a coincident current matrix to provide a small low cost memory. The switching core address matrix is organized in a unique manner wherein one of a plurality of switches is selectively combined with one of a plurality of drivers to activate any one of the $x$ lines of the coincident current matrix. Simultaneously a similar selective combination is energized from among a second plurality of switches and drivers to concurrently activate any one of the $y$ lines of the coincident current matrix. Each switching core address matrix is thus comprised of a plurality of cascade connected switches and drivers. A novel resetting apparatus is also included which resets only those cores of the memory which have been previously selected.

The present invention relates to a storage device or memory such as is often used in data processing systems. More particularly, the present invention relates to a small, low cost memory device which uses switching cores for addressing.

The continued quest for additional storage capacity as well as the increased uses of memory devices throughout the electronic industry has resulted in an ever growing need for smaller, less expensive storage devices. While there have been previous inexpensive memories constructed, most earlier improvements have been traditionally achieved through radical reduction in performance levels. The present invention, however, provides a small low cost memory having operating characteristics which are compatible with the stringent standards specified by present-day needs.

It is, therefore, an object of the present invention to provide an inexpensive memory for a data processing system.

It is a further object of this invention to provide an inexpensive memory whose operating characteristics have not been excessively degraded in order to accomplish the decrease in cost.

It is a still further object of the present invention to provide a low-cost, general-purpose, random-access, coincident-current memory device which could find use in numerous applications.

It is also an object of the present invention to provide a novel addressing apparatus for a low cost memory.

Still another object of this invention is to provide a memory whose addressing apparatus utilizes switch cores in a novel manner.

Basically, therefore, the present invention provides a low cost memory in which cascaded switch core matrices are used in conjunction with simple constant current drivers. This not only permits wide variations in component parameters but also allows operation over a considerable temperature range. Specifically, the use of the switch cores has resulted in a significant reduction in overall component count.

The remainder of the circuitry—information (digit) drivers, sense amplifiers, and reset drivers—are simple switching circuits also designed to operate with a minimum of components.

Considerable effort was expended in selecting the least expensive components which were adequate for the design. The production estimate for a memory which includes all the driving, inhibiting, and sensing circuitry, as well as recirculating, and inserting information in the output register, is substantially less than the cost per bit presently prevailing throughout the industry. It is, of course, assumed that the voltages and timing pulses are provided by the data processing system in which such a memory would be used.

Additional features and other objects of the present invention will become apparent from a reading of the following detailed description, which is primarily given for purposes of illustration and not limitation.

The description is given with reference to the accompanying drawings in which:

FIGURE 1 is a block diagram of a complete character memory including the addressing apparatus proposed by the present invention;

FIGURES 2A, 2B and 2C, taken together, illustrates a detailed schematic diagram of the X switch core matrix shown generally in FIGURE 1;

As noted previously, a primary design criteria for this memory was low cost. The first effort at achieving this was focused in the memory stack itself. A 50-mil core was selected for use in the illustrative embodiment since the labor involved in wiring the stack is noticeably reduced over the smaller 18- or 30-mil cores. The memory stack was wound on a single plane consisting of six mats, or areas, of 32 x 32 cores. Quantity production costs per bit for such a stack are estimated to be about one third of the cost of the overall completed memory. However, it should be noted that the technique being described is equally applicable to 18- or 30-mil stacks, and such cores could be used for systems which require faster cycle times in the 1–2 $\mu$sec. region. The only additional cost for such higher speed memories, besides the memory plane, would be involved in the use of slightly more complex sense amplifiers.

The present design is also based on minimal voltage requirements. Actually, only a single positive voltage is necessary for complete memory operation. A twelve-volt source is used in the present embodiment. Efficiency and design simplicity is obtained basically by use of the power supply available in the system as a service for the micro-logic circuits. In the illustrative embodiment the available supply was +3.6 volts.

Figure 1:
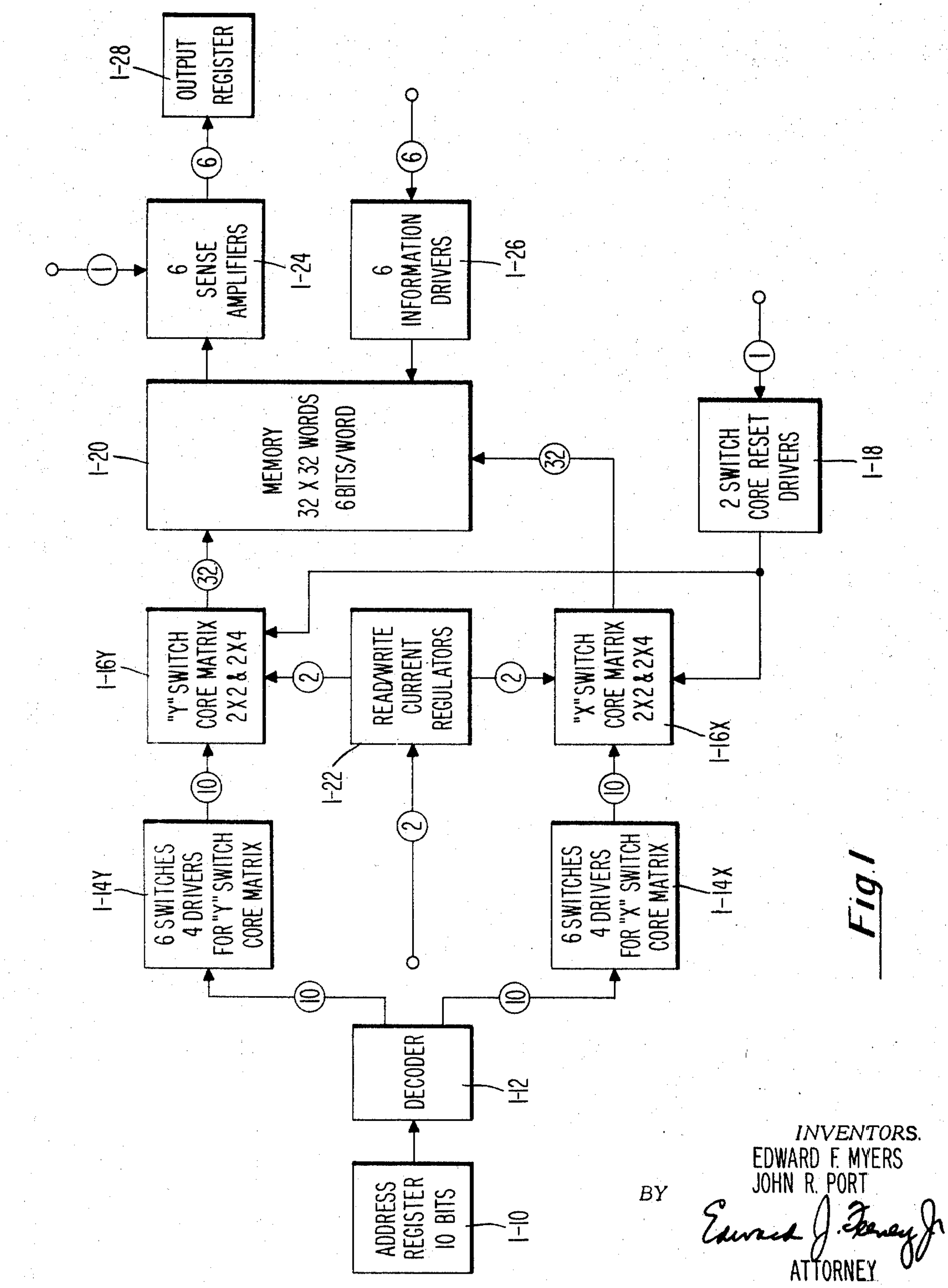

Referring, in particular, to the block diagram of the memory shown in FIGURE 1, a preferred configuration of a memory is illustrated having 1024 separate word locations. Each of the 1024 word locations is six bits in length. A six-bit word is herein called a character. Thus, the present memory is also referred to as a character memory.

In order to individually address the 1024 locations, a binary number ten digits long is required, since $2^{10}=1024$. Consequently, the address register 1–10 is specified as having a capacity of ten bits.

This 10-bit address is first translated by decoder 1–12 into an X and a Y signal representation. These translated signals are simultaneously applied to a first and a second group of switches and drivers 1–14X and 1–14Y. There are six switches and four driver circuits in each of the two groups. It is apparent that one of the groups, 1–14X, operates in conjunction with the X switch core matrix, 1–16X, while the other group, 1–14Y, operates in a corresponding fashion with the Y switch core matrix, 1–16Y.

Four current regulators are contained in the read/write current regulators, 1–22. They include a pair of read and a pair of write drivers. They operate with the X switch core matrix 1–16X and the Y switch core matrix 1–16Y to activate the memory 1–20.

Two switch core reset drivers 1–18 are respectively connected to the X and the Y switch core matrices 1–16X and 1–16Y after each selection.

Also shown generally in FIGURE 1 is a group of six information drivers 1–26, one to drive each of the six-bit lines per character word of the memory. A group of six sense amplifiers 1–24 are correspondingly connected to each of the respective six-bit lines and perform their denoted function.

Basically, the operation of the memory illutsrated is as follows: The ten-bit address stored in address register 1–10 is decoded 1–12 to provide signals for the X and Y switch core matrices 1–16X and 1–16Y via switches and drivers 1–14X and 1–14Y. Each of the X and Y switch core matrices comprises a 4 x 2 matrix connected in cascade with a 2 x 2 matrix. One core from the 4 x 2 matrix and one from the 2 x 2 matrix of both the X and the Y switch core matrix is selected and the illustrated interconnections are such that one if the 32 address lines for both X and Y switch core matrices provides an output signal to the stack 1–20. The two groups of 32 lines each are independently and respectively buffered through a pair of read current regulators, each of which provides a one-half read current. The coincidence of the X and the Y read currents in each of the six mats selects the desired six-bit character in the stack 1–20 and simultaneously produces a plurality of six output signals to each of the six sense amplifiers 1–24. These amplifiers, in turn, respectively transfer the information to the six-bit output register 1–28. When this read cycle is concluded, the reset drivers 1–18 are activated to reset the cores previously selected in the matrices 1–16X and 1–16Y. Once again a signal appears on the same lines (X and Y) previously selected in the memory 1–20; however, it is of opposite polarity. The output signals from these addressed lines are then buffered through two write current regulators 1–22, which are activated during this interval. Each regulator provides one half of the necessary write current. The six information drivers 1–26 are also energized during this interval in order to write the desired information into the selected location of memory 1–20.

Figure 2C:
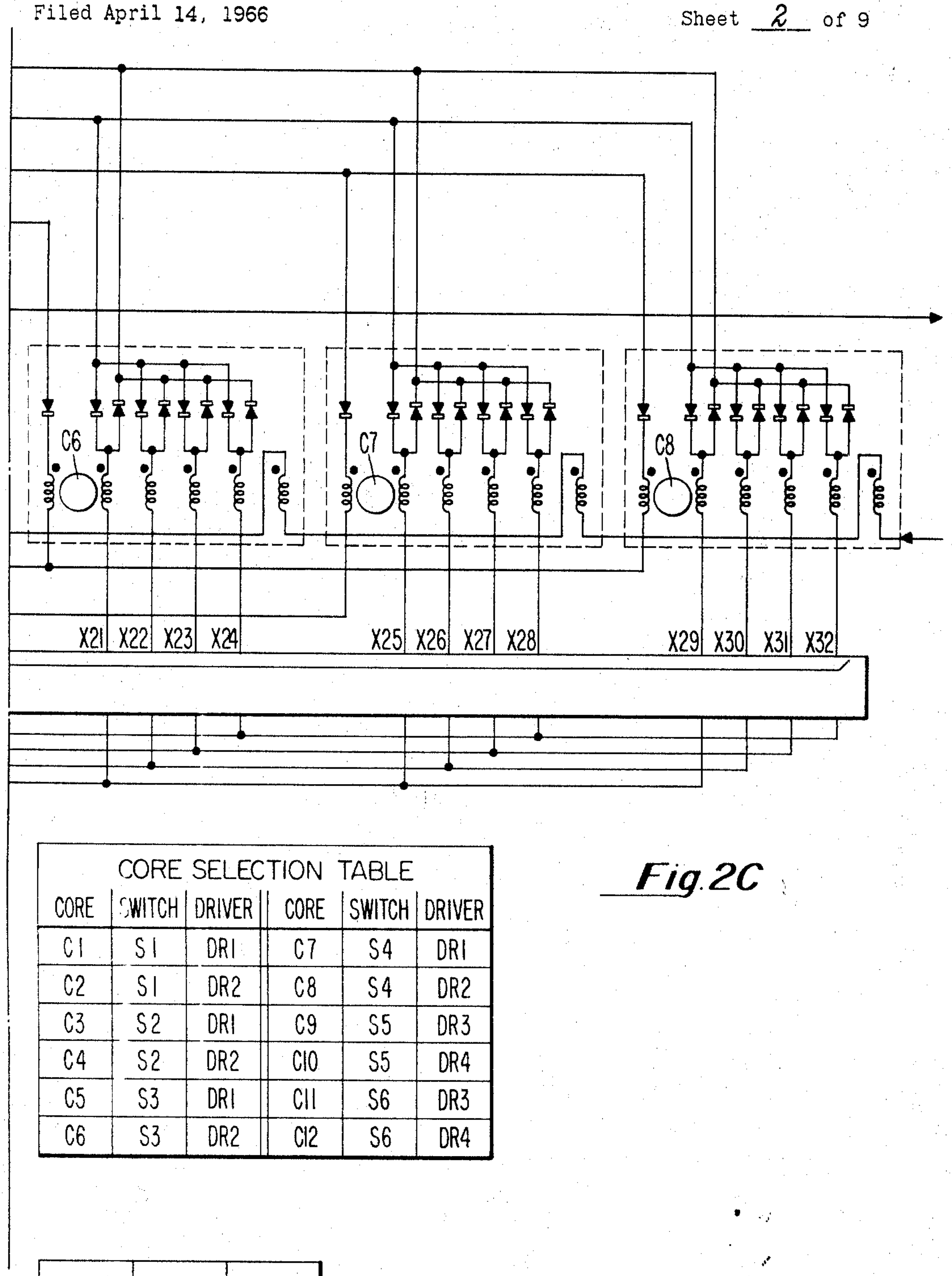
Figure 2:
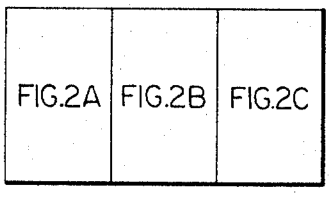
Figure 2A:
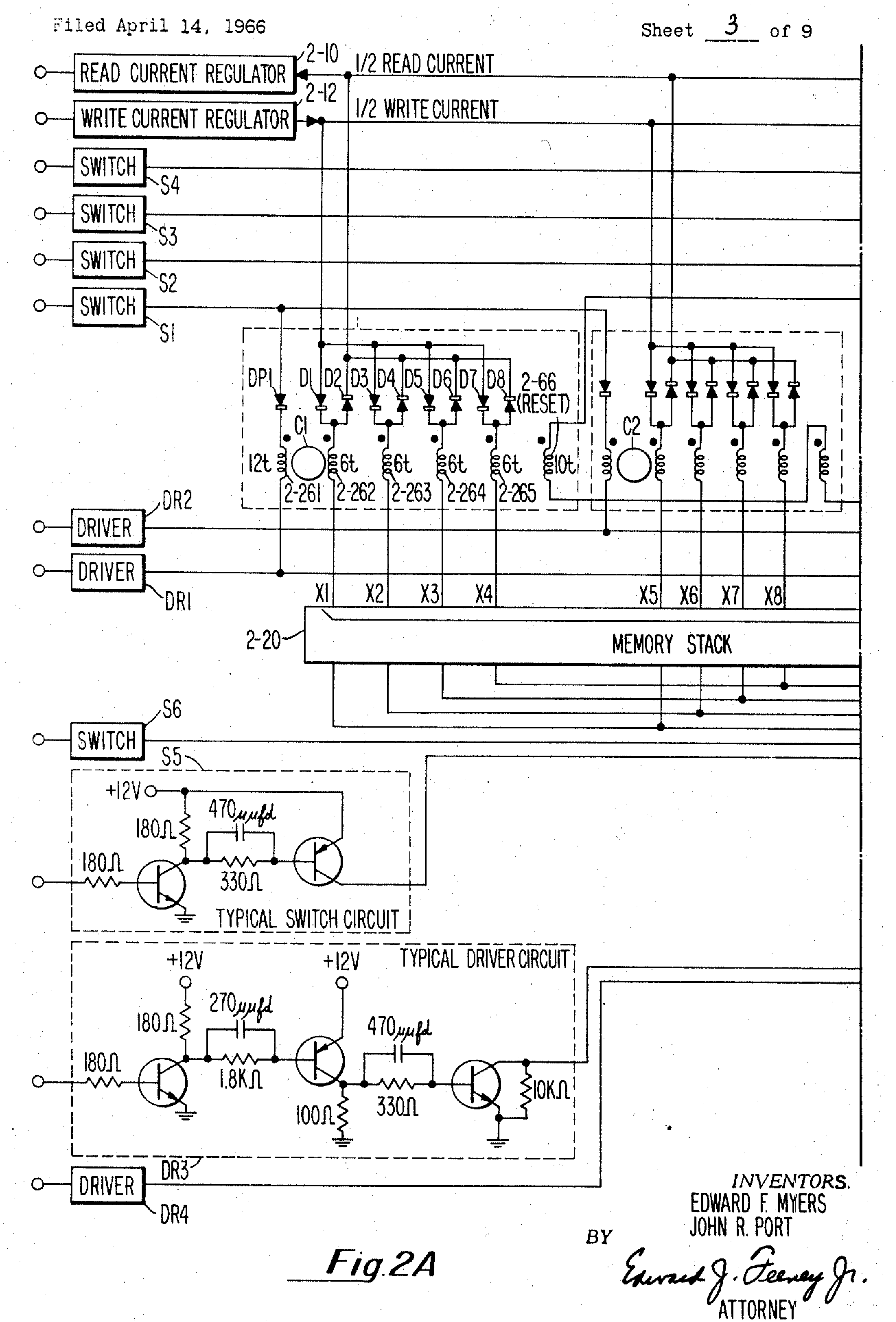
Figure 2B:
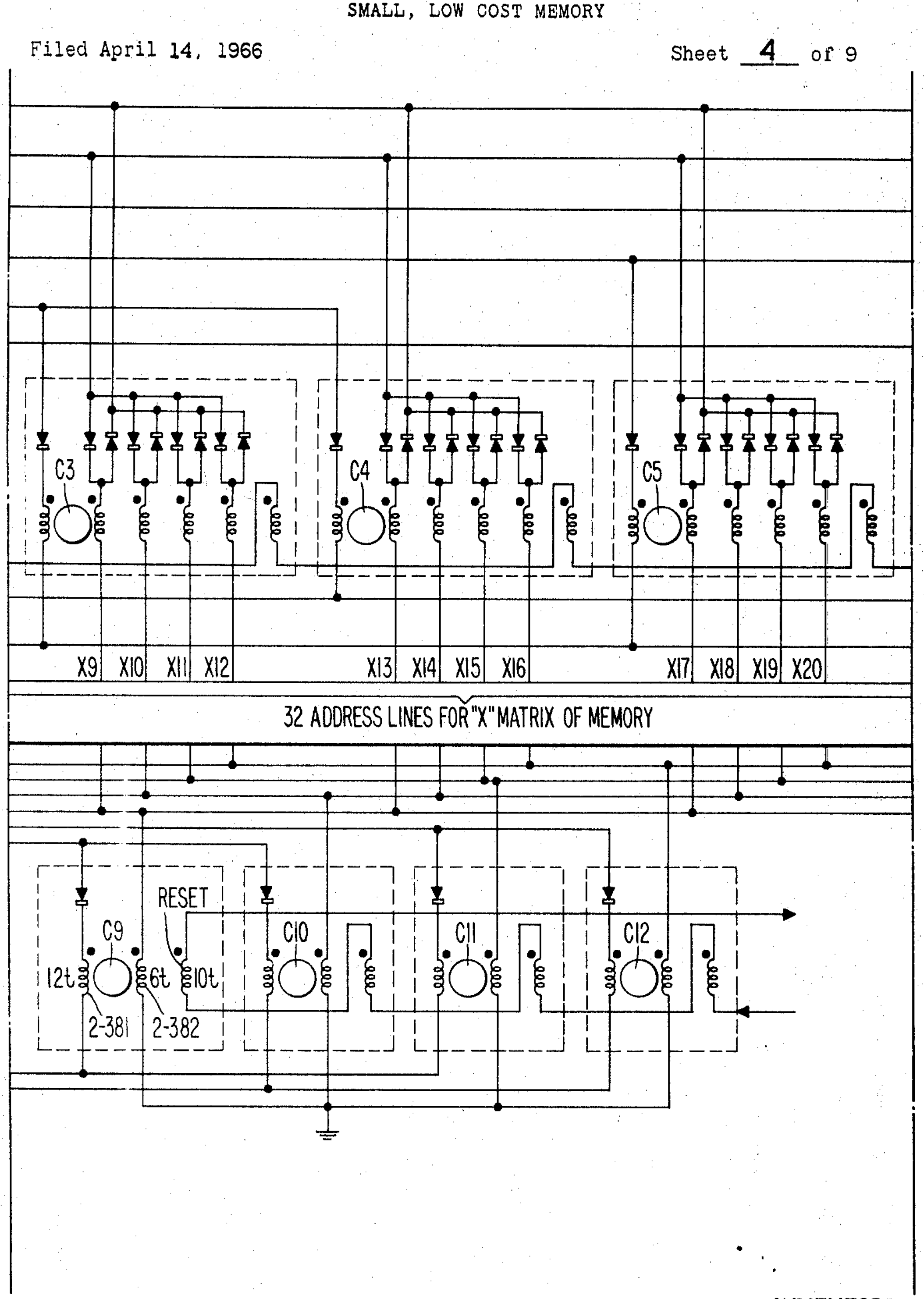

The details of this circuit operation may be more readily appreciated upon consideration of FIGURES 2A, 2B and 2C. For simplicity of explanation, only the X switch core matrix referenced as 1–16X in FIGURE 1 will be considered. However, it is to be understood that a corresponding operation is being simultaneously performed in the Y switch core matrices 1–16Y.

Initially, all of the cores in both the 4 x 2 and the 2 x 2 switch matrices are in the reset or "zero" state. Thus, cores C1 to C8 in the 4 x 2 matrix across the top of the FIGURE 2 and cores C9 to C12 in the 2 x 2 matrix at the bottom are simultaneously reset. This resetting operation is accomplished by the connection shown in the lower right-hand corner of FIGURE 2. Along the left-hand side of this figure, a group of six switches S1, S2, S3, S4, S5 and S6, and four drivers DR1, DR2, DR3 and DR4, are illustrated. The read and write current regulators 2–10 and 2–12, respectively, are shown in the upper left-hand corner.

Upon simultaneous activation of switch S1 and driver DR1, it is apparent that current will flow only through the twelve-turn coil 2–261 to switch the core C1. Similarly, in the lower portion of the figure, common activation of switch S5 and the driver DR3 will cause current to flow through coil 2–381 and thereby initiate the switching of core C9. Thus, current will flow in one core of each matrix such that it will begin to switch to the "ONE" state, producing a voltage in secondary windings of each of these two cores. All of the secondary windings are, in turn, interconnected as shown such that a net EMF appears on only one of the thirty-two memory address lines X1–X32. The operation is similar to that present in the well-known Bimag biased diode loop. All of the address lines are buffered together with diodes to one of the constant current read drivers shown in FIGURE 3.

Figure 3:
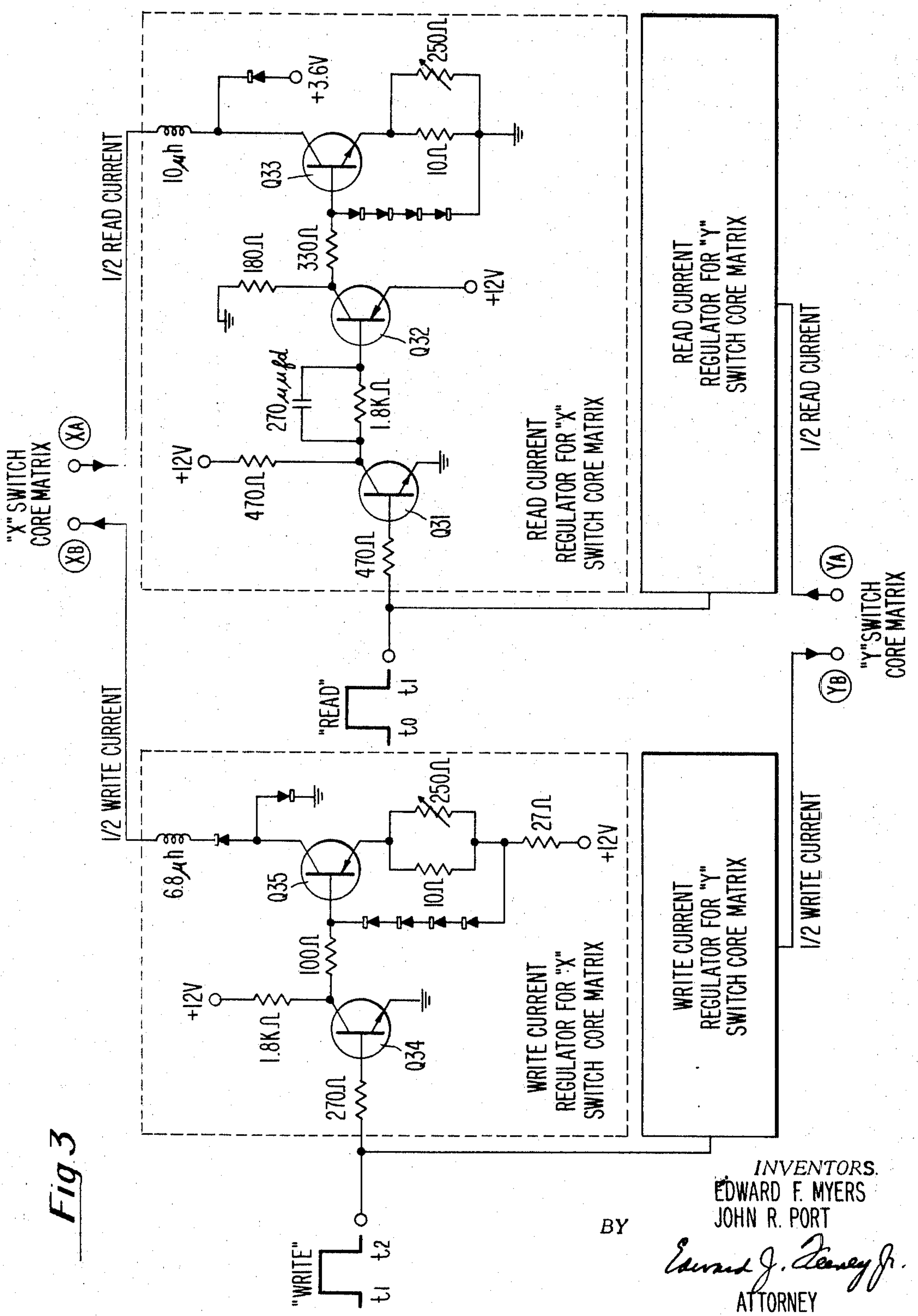
FIGURE 3 is a schematic diagram of the current regulator drivers used, illustrating both the read and the write driver circuitry.

Referring in particular to FIGURE 3, there is shown a pair of read current regulators and a pair of write current regulators. One current regulator of each pair is connected for operation with the X switch core matrix through terminals $X_A$, $X_B$ and the remaining regulator of each pair operates with the Y switch core matrix through terminals $Y_A$ and $Y_B$. As illustrated, each regulator supplies one half of the current necessary to selectively switch the desired core in a particular memory matrix.

Consider first the read current regulator shown on the right of FIGURE 3. As illustrated, a read signal is simultaneously sent to both of the read current regulators, i.e., the regulators for both the X and Y switch core matrices. However, since this description will involve identical read current regulators, only one of such regulators is illustrated in detail, and only one will be described.

The presence of a positive read signal at the input terminal to the read regulator will turn "ON" the NPN transistor Q31. Thus, a base current will flow through the 470-ohm base resistor and the base-emitter junction of the transistor Q31. Consequently, a collector current will flow from the positive 12-volt source through the 470-ohm collector resistor and the collector-emitter junction of transistor Q31 to effectively ground the collector terminal. Thus, one end of the parallel circuit comprised of a 1.8KΩ resistor and a 270$\mu\mu$fd. capacitor and connected to the base terminal of transistor Q32 is grounded. This grounding causes a base current to flow from the 12-volt terminal through the base-emitter junction of the PNP transistor Q32. Usual transistor action will turn transistor Q32 "ON" and thereby effectively place its collector terminal at +12 v. A third transistor Q33 has its base connected through a 330-ohm resistor to the collector terminal of transistor Q32. The base voltage level of transistor Q33 is determined by the group of series diodes in the base circuit. The collector current flowing through the collector-emitter junction of Q33 provides one half of the read current required by the X switch core matrix. The diode connected to the collector of transistor Q33 prevents the transistor from saturating. The variable 250-ohm resistor connected in parallel across the special temperature compensating 10-ohm resistor in the emitter circuit of transistor Q33 is a means of adjusting this read current. A 10-microhenry coil is serially connected between the X switch core matrix terminal XA and the collector terminal of transistor Q33 in order to determine the rise time.

Since this current driver is turned on simultaneously with the activation of the switches in the matrices, an EMF is generated in the two selected cores to provide the collector voltage for this driver, and a constant current (½ read current) flows only through the selected memory address line. The Y matrices operate in the same manner, providing the one-half read current for the Y address lines. Current is regulated and temperature compensated by the combined effects of the diodes in the base circuit and the special 10Ω temperature compensating resistor in the emitter of the driver transistor Q33.

In summary, therefore, the application of a read signal to this trio of transistors comprising the read current regulator provides one half of the read current required by the X switch core matrix.

Figure 7:
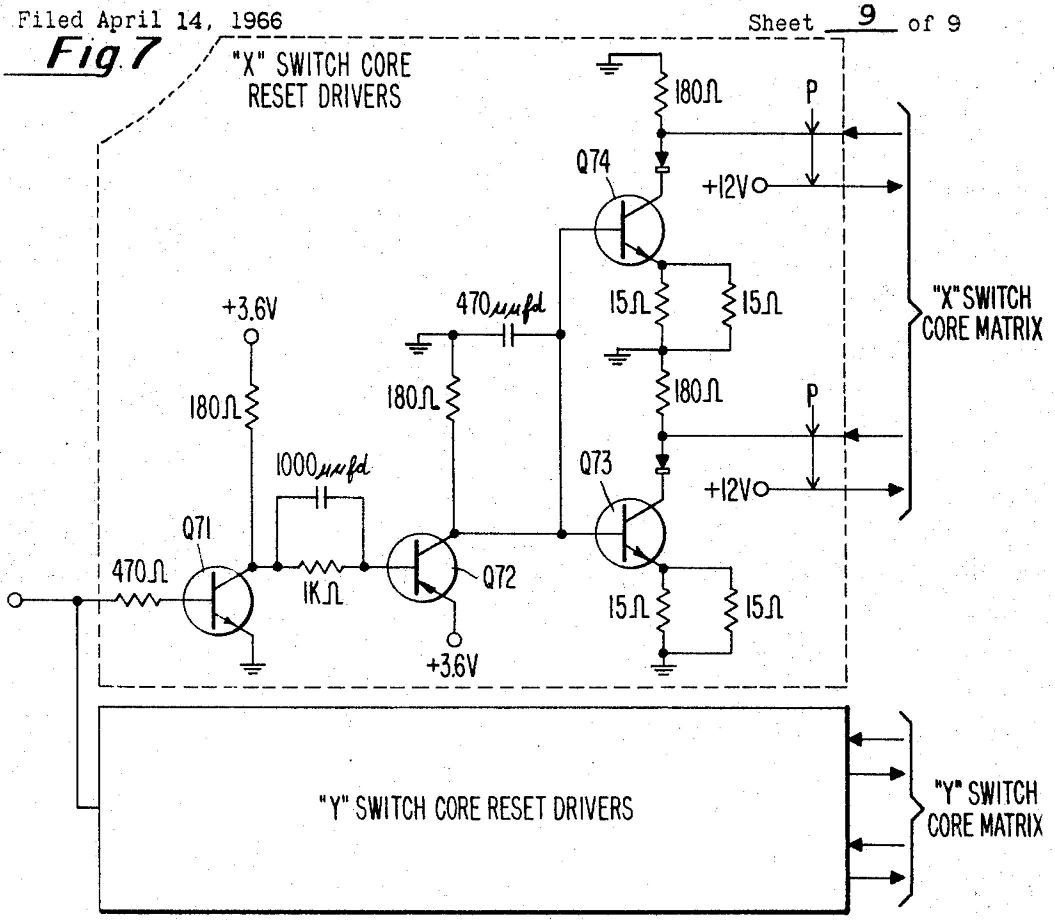
FIGURE 7 is a schematic diagram of one of the switch core reset drivers used in the present preferred memory configuration.

At the conclusion of the read current cycle, the switches in each of the two matrices and the read current driver are inactivated. A reset driver, shown in a detailed schematic form in FIGURE 7, is connected to all cores. This serial coil connection is shown in the lower right-hand corner of FIGURE 2. This reset driver is activated and the two cores which have been selected during the read cycle are reset to the binary "ZERO" state. This resetting operation provides an EMF of opposite polarity in the secondary windings on the selected memory address lines. The same point on the secondary winding is also buffered with diodes, of opposite connections, to another constant current driver. This is the write driver shown in schematic detail in FIGURE 3. It is turned on in concidence with the reset driver, and provides one half of the write current through the selected memory address line of the X matrix.

A write signal is simultaneosuly applied to both write current regulators shown in FIGURE 3. However, as in the case of the read regulators, only one of the write current regulators will be described in detail. The application of the write signal at time $t_1$ to the input transistor Q34 causes a base current to flow through the 270-ohm resistor and the base-emitter junction of transistor Q34. This base current causes a collector current to flow from the 12-volt source through the 1.8K resistor and the collector-emitter junction of transistor Q34. This effectively grounds the collector terminal of that transistor. The grounding of the 100-ohm resistor causes a base current to flow through the emitter-to-base junction of transistor Q35 and a collector current is initiated. As previously described, a 10-ohm resistor is paralleled by *a* 250-ohm resistor as a means of write current adjustment through the switch core matrix.

In each of the four regulators shown in FIGURE 3, a plurality of diodes are serially joined together and effectively connected across the base-to-emitter junction of the output transistor. In each case these diodes are means of temperature compensation, and any further discussion regarding their specific use is not necessary to the description of this invention.

The write current regulator of the Y switch core matrix, shown at the bottom of the figure, similarly causes a one-half write current to flow through terminal $Y_B$ to the Y switch core matrix. Also, the read current regulator of the Y switch core matrix supplies the one-half read current through terminal $Y_A$ to the Y switch core matrix.

The Y matrix, although not shown in FIGURE 2, has physical and operational characteristics identical to those of the X matrix just described.

Figure 4:
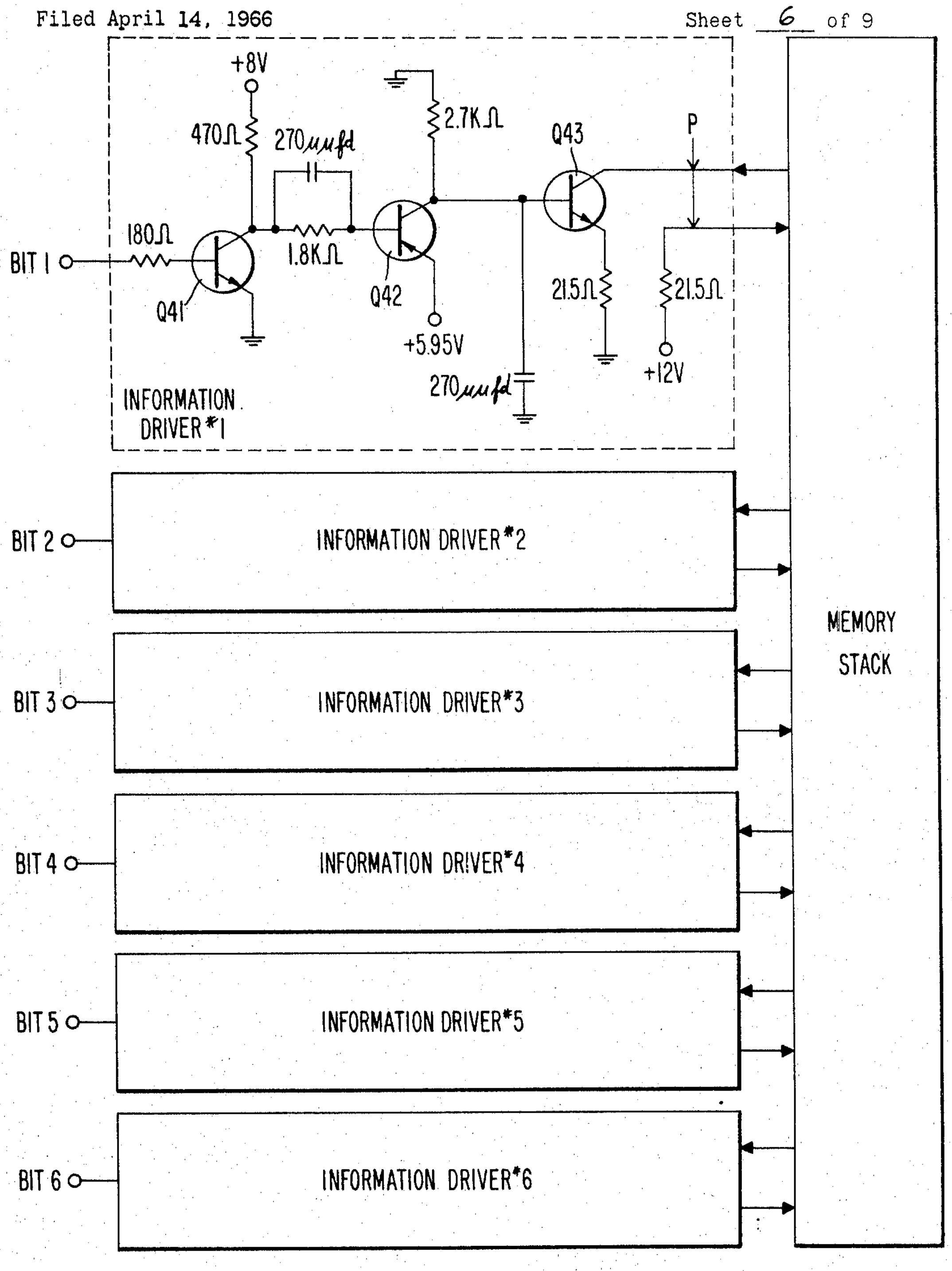
FIGURE 4 is a detailed schematic diagram of one of the six information (bit) drivers for the character memory with the remaining five drivers shown in block diagram form.
Figure 8:
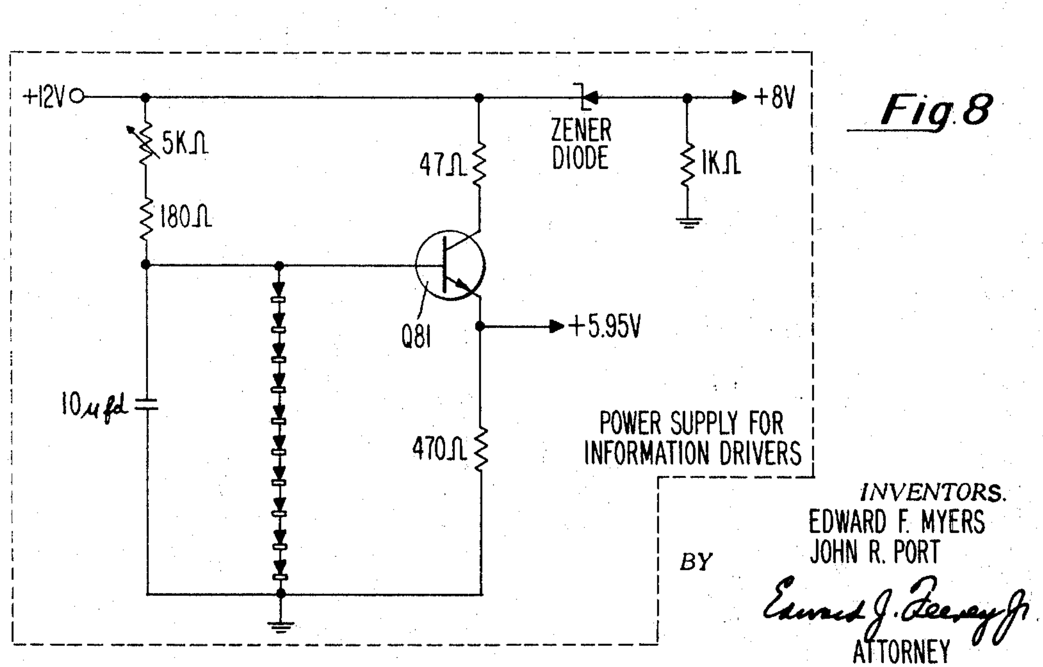
FIGURE 8 is a schematic diagram of the power supply used in conjunction with the information driver circuits.

FIGURES 4 and 8 will be discussed together, since the circuit shown in FIGURE 8 supplies part of the power used by the information driver circuit illustrated in FIGURE 4. Basically, the power supply circuit of FIGURE 8 is a simple emitter follower circuit with the base voltage of transistor Q81 being controlled a diode network for temperature compensation. An NPN transistor Q81 is used on the emitter follower circuit. It supplies the +5.95 v. from its emitter to the emitter of transistor Q42 in the information driver #1 circuit illustrated in FIGURE 4. The eight (+8.0 v.) collector supply voltage used by transistor Q41 is also supplied from the power supply circuit of FIGURE 8. However, it is supplied across a 1KΩ resistor which is connected through a Zener diode to the +12 supply used by the remainder of the system. The output of the transistor Q43 is coupled through a pair of lines to the memory stack. A capacitor connected across this transistor input acts to control the rise time.

Figure 5:
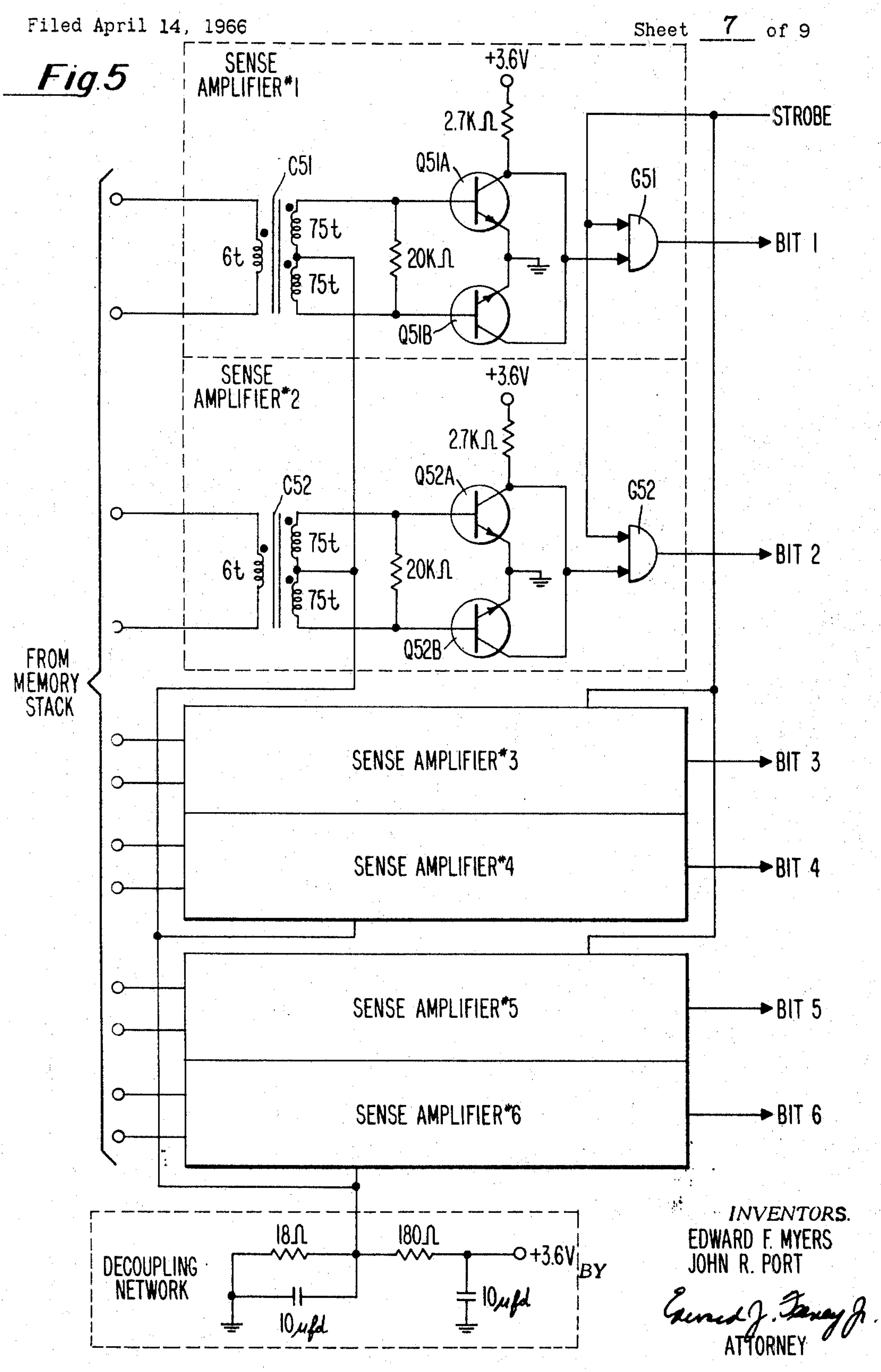
FIGURE 5 is a detailed schematic diagram of one pair of the total of six sense amplifiers used by the character memory.

Refer next to FIGURE 5 wherein are shown the six sense amplifiers used in the present embodiment.

The signals from the memory stack are coupled through transformer C51 and applied through the center tapped transformer secondary to the bases of transistors Q51A and Q51B. The collectors of both transistors are returned to a +3.6 v. collector voltage supply through a common 2.7KΩ load resistor. Its output signal is gated through an AND gate G51 when a strobe signal is also present at the input to that gate.

Thus, the simple sense amplifier shown in FIGURE 5 transformer couples the sense signal to a pair of transistors to provide the bipolar sensing operation. The output signal so sensed is gated directly into the micrologic.

Figure 6A:
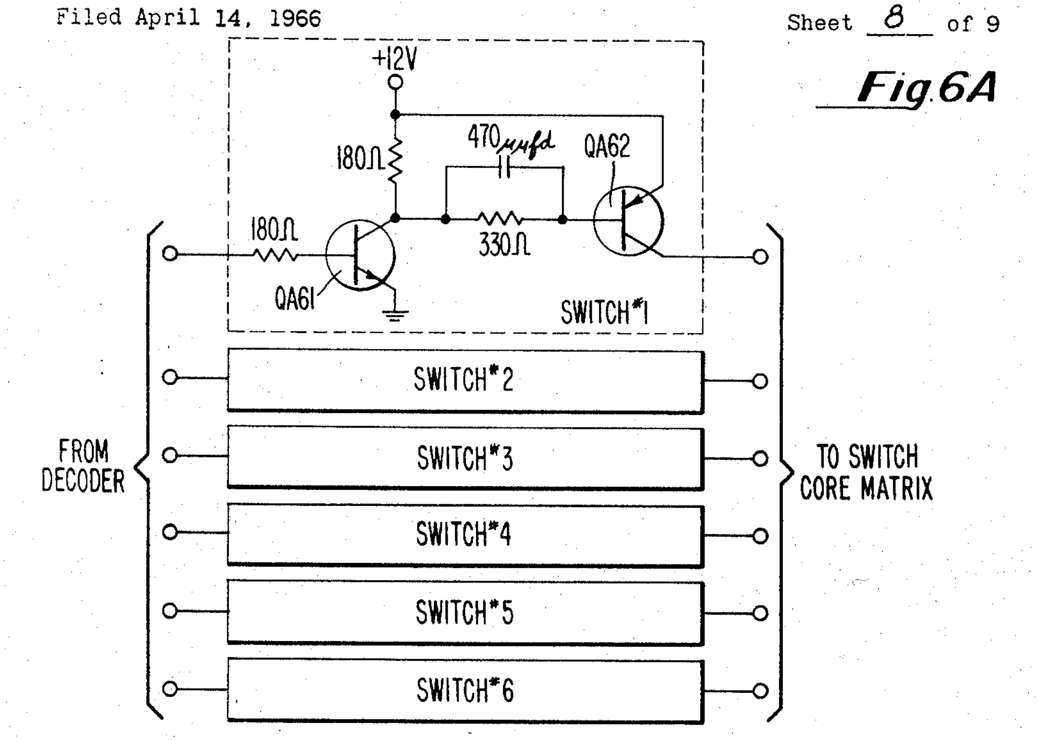
FIGURE 6A is a detailed schematic of one of the six selection switch circuits.
Figure 6B:
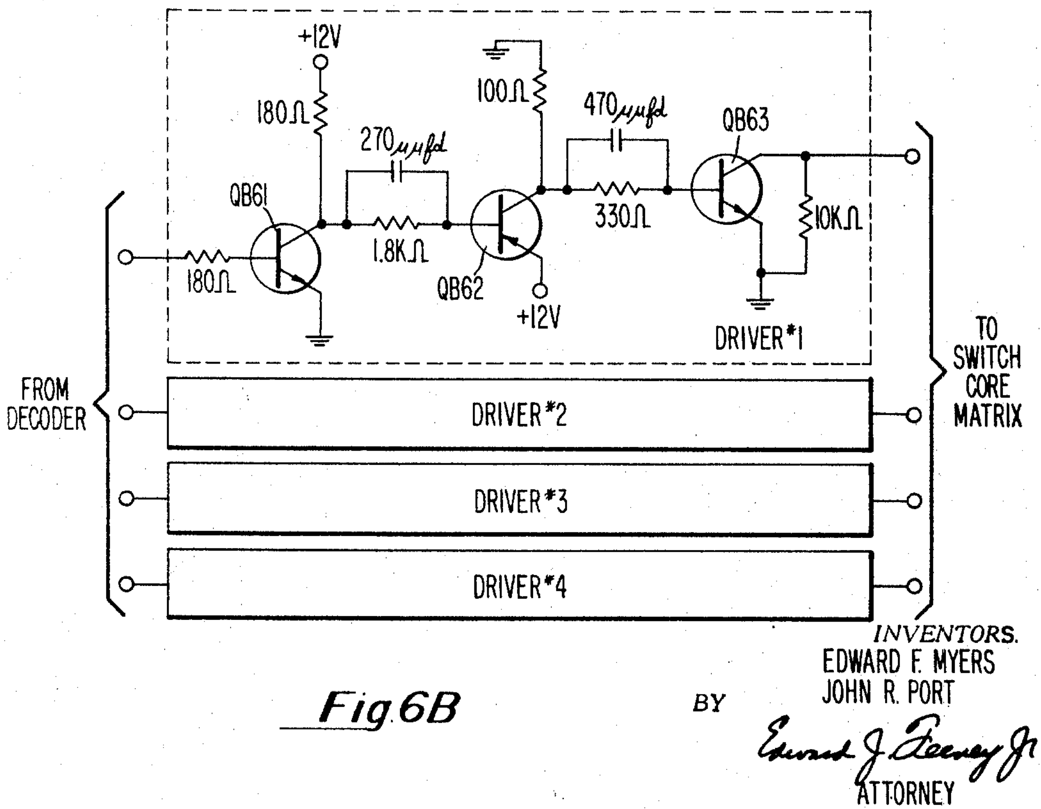
FIGURE 6B is a corresponding schematic of one of the four driver circuits used in conjunction with the six selection switch circuits.

FIGURES 6A and 6B respectively denote the switches and the drivers used in conjunction with FIGURE 2, i.e., the six switches S1–S6 and the four drivers DR1 to DR4. As was explained in conjunction with FIGURE 2, each core, C1 to C12, is serially connected between a switch S and a driver DR.

In the case of the switch S1, an NPN transistor QA61 operates to activate a PNP transistor QA62. By turning this latter transistor "ON," the collector voltage source +12 v. is effectively applied through the collector-emitter junction of transistor QA62. Similarly, the driver DR1, upon receipt of an input signal to transistor QB61, activates transistors QB62 and QB63. It is obvious that the turning "ON" of transistor QB63 will place its collector terminal effectively at ground potential. Consequently, the respective voltage levels applied to the primary coils of each of the cores C1 to C12 are a positive 12 volts to one end an a zero level or ground reference at the other.

FIGURE 7 is a detailed schematic of one of the reset drivers used to return the cores C1–C12 to their original states after they have been switched by the switches and drivers illustrated in FIGURES 6A and 6B, respectively. Those reset drivers used to reset the X switch cores will be described, but it is understood that those drivers used to reset the Y switch cores are identical.

Transistor Q71 is turned "ON" by the input signal to the reset driver. This activates transistor Q72 and simultaneously applies a +3.6 v. potential to the bases of transistors Q73 and Q74. The passage of respective collector currents of transistors Q73 and Q74 through the coils of cores C1 to C12 accomplishes the resetting operation.

Although there have been shown and described only a specific configuration with particular operations and interconnections, it is apparent that other configurations with many more operations and interconnections are possible without departing from the spirit of the present invention. Therefore, this invention is not to be limited except insofar as is indicated by the purview of the disclosure itself.

What is claimed is:

1. A memory system comprising a coincident current memory stack, a switch core matrix selection means connected to said memory stack for selectively activating the storage locations thereof, an addressing means with a decoding means connected to said selection means through said decoding means and a plurality of current regulators connected to said memory stack for alternate activation by said switch core matrix selection means.

2. The memory system as set forth in claim 1 above wherein said switch core matrix selection means includes an X and a Y core matrix, each having a first and a second switch core matrix interconnected in cascade with said memory stack.

3. The memory system as set forth in claim 1 wherein the decoding means with said addressing means includes an X and a Y switch/driving means respectively connected to the matrix selection means.

4. The memory system as set forth in claim 3 wherein said addressing means includes a binary address storage register, each bit location of which is individually connected to a switch/driver of said switch/driving means.

5. The memory system as set forth in claim 1 wherein said plurality of current regulators includes a pair of read current regulators and a pair of write current regulators, each regulator of said pair of read regulators to provide one half of the read current and each regulator of said pair of write regulators to provide one half of the write current for said memory stack.

6. A memory system comprising a coincident current memory stack, an X and a Y switch core matrix selection means, an address decoding means to provide signals for the X and Y switch core matrices, each of the selection means including a first and a second switch core matrix connected in cascade, means to select one core from each matrix, interconnecting means to enable both said X and said Y core matrix to provide an output signal to said memory stack, line buffering means connected to said switch core matrices to independently buffer together the output therefrom, a first and a second read current regulator connected to said buffering means to individually provide a one-half read current signal the coincidence of both of said read current signals enabling the selection of the desired location in said stack and the simultaneous production of an identifying signal therefrom, a first and a second write current regulator connected to said stack and a plurality of reset means connected to said switch core matrices to reset those memory storage elements previously selected by the signals from said address decoding means.

7. The memory system as set forth in claim 6 above wherein said plurality of reset means comprise a plurality of reset drivers connected for activation at the conclusion of the read operation, said drivers connected to said first and second switch core matrices to reset the previously selected cores therein and thereby cause the production of a second signal of opposite polarity on the same lines previously selected, a first and a second write current regulator with line buffering means for independently buffering said address lines thereto, each of said write regulators to provide, upon activation, a one-half write current signal and an information driver connected to said stack and simultaneously activated with said write current regulators to provide an information signal therefrom, the coincidence of said write current signals and said information signal to thereby create the desired information in a selected memory location.

8. An address selection apparatus for use with a random-access, coincident-current memory plane comprising an address decoder to provide appropriate switching signals, an X and a Y switch core matrix both connected to said decoder, each of said core matrices including a plurality of cascade connected submatrices, core selection means connected to select one core from each of said submatrices with interconnections therebetween to enable one of the address lines for both said X and said Y matrices to provide an output signal to the memory plane, a plurality of read current regulators with line buffering means for independently buffering said address lines thereto, each of said read regulators to provide, upon activation, a portion of the read current signal required by said memory plane, the coincidence of which enables the selection of the desired character in said plane and the production of an identifying output signal therefrom, a plurality of reset drivers for activation at the conclusion of the read operation connected to both of said pluralities of submatrices to reset the previously selected cores therein and thereby cause the production of a second signal of opposite polarity on the same lines previously selected, a plurality of write current regulators with line buffering means for independently buffering said address lines thereto, each of said write regulators to provide, upon activation, a portion of the write current signal and an information driver simultaneously activated therewith to provide an information signal therefrom, the coincidence of said write currents and said information signal to thereby create the desired information in the selected location of said memory plane.

9. An address selection apparatus as set forth in claim 8 above wherein the plurality of cascade connected submatrices includes a first submatrix for individual activation by a first group of switch circuits in conjunction with a first group of driver circuits and a second submatrix for similar and simultaneous activation by a second group of switch circuits and a second group of driver circuits.

10. An address selection apparatus as set forth in claim 8 wherein said plurality of read current regulators and said plurality of write current regulators each include a first and a second current regulator to respectively provide one-half read and one-half write current signals to said memory plane.

11. An address selection apparatus for use with a random-access, coincident-current memory stack comprising an address decoder to provide appropriate switching signals, an X and a Y switch core matrix both connected to said decoder, each of said core matrices including a plurality of cascade connected submatrices, core selection means connected to select one core from each of said submatrices with interconnections therebetween to enable one of the address lines for both said X and said Y matrices to provide an output signal to the memory stack, a plurality of read current regulators with line buffering means for independently buffering said address lines thereto, each of said read regulators to provide, upon activation, a portion of the read current signal required by said memory stack, the coincidence of which enables the selection of the desired character in the memory stack and the production of an identifying output signal therefrom, a plurality of reset drivers for activation at the conclusion of the read operation connected to both of said pluralities of submatrices to reset the previously selected cores therein and thereby cause the production of a second signal of opposite polarity on the same lines previously selected, a plurality of write current regulators with line buffering means for independently buffering said address lines thereto, each of said write regulators to provide, upon activation, a portion of the write current signal and an information driver simultaneously activated therewith to provide an information signal therefrom, the coincidence of said write currents and said information signal to thereby create the desired information in the selected location of said memory stack.

12. A memory system comprising a random-access, coincident-current memory stack, an address decoder to provide appropriate switching signals, an X and a Y switch core matrix both connected to said decoder, each of said core matrices including a plurality of cascade connected submatrices, core selection means connected to select one core from each of said submatrices with interconnections therebetween to enable one of the address lines for both said X and said Y matrices to provide an output signal to the stack, two read current regulators with line buffering means for independently buffering said address lines thereto, each of said read regulators to provide, upon activation, one-half read currents, the coincidence both of which enables the selection of the desired character in the memory stack and the production of an identifying output signal therefrom, a plurality of reset drivers for activation at the conclusion of the read operation connected to both of said pluralities of submatrices to reset the previously selected cores therein and thereby cause the production of a second signal of opposite polarity on the same lines previously selected, two write current regulators with line buffering means for independently buffering said address lines thereto, each of said write regulators to provide, upon activation, one-half write currents and an information driver simultaneously activated therewith to provide an information signal therefrom, the coincidence of said write currents and said information signal thereby enable the creation of the desired information in the selected memory location.

13. The memory system as set forth in claim 12 wherein said memory stack includes a plurality of identical memory planes and the lines carrying said output signals from said X and said Y switch core matrices are commonly connected to all of said plurality of memory planes.

14. The memory system as set forth in claim 12 wherein said read current regulators and said write current regulators are unidirectionally connected to each of the lines of said memory stack through a plurality of diode devices.

15. Apparatus means for addressing a coincident current memory means comprising, in combination, a plurality of cascade connected submatrices, core selection means connected to select one core from each of said submatrices with interconnections therebetween to enable one of the address lines for both said X and said Y matrices to provide an output signal to the memory means, two read current regulators with line buffering means for independently buffering said address lines thereto, each of said read regulators to provide, upon activation, a one-half read current signal, the coincidence both of which enables the selection of the desired character in the memory means and the production of an identifying output signal therefrom, a plurality of reset drivers for activation at the conclusion of the read operation connected to both of said pluralities of submatrices to reset the previously selected cores therein and thereby cause the production of a second signal of opposite polarity on the same lines previously selected, two write current regulators with line buffering means for independently buffering said address lines thereto, each of said write regulators to provide, upon activation, a one-half write current signal and an information driver simultaneously activated therewith to provide an information signal therefrom, the coincidence of said write current signals and said information signal to thereby create the desired information in the selected memory location.

References Cited

UNITED STATES PATENTS

| | | | |
|---|---|---|---|
| 3,030,019 | 4/1962 | Smith | 235—157 |
| 3,108,256 | 10/1963 | Buchholz et al. | 340—172.5 |
| 3,157,860 | 11/1964 | Batley | 340—174 |

PAUL J. HENON, *Primary Examiner.*

JOHN P. VANDENBURG, *Assistant Examiner.*

U.S. Cl. X.R.

340—174